United States Patent
Harper, Jr. et al.

(10) Patent No.: US 6,649,215 B2
(45) Date of Patent: Nov. 18, 2003

(54) METHODS FOR MAKING COATED FIBER STRANDS HAVING ONE OR MORE HETEROGENEOUS REGIONS

(75) Inventors: Daniel Harper, Jr., Kennesaw, GA (US); John M. Turnipseed, Lilburn, GA (US); Carl R. Taylor, Lawrenceville, GA (US); Priya L. Tabaddor, Alpharetta, GA (US); James R. Petisce, West Dundee, IL (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 09/952,805

(22) Filed: Sep. 12, 2001

(65) Prior Publication Data

US 2002/0034584 A1 Mar. 21, 2002

Related U.S. Application Data

(62) Division of application No. 09/307,306, filed on May 7, 1999, now Pat. No. 6,317,553.

(51) Int. Cl.[7] .............................. B05D 5/06; B05D 1/34; G02B 6/22
(52) U.S. Cl. ................. 427/163.2; 427/286; 427/407.1; 118/125; 118/255; 385/128
(58) Field of Search .............................. 427/162, 163.1, 427/163.2, 164, 165, 256, 258, 269, 286, 508, 510, 513, 514, 553, 558, 261, 407.1; 385/126–128, 103, 114; 118/125, 255

(56) References Cited

U.S. PATENT DOCUMENTS

| | | | |
|---|---|---|---|
| 4,474,830 A | * 10/1984 | Taylor | ..................... 427/163.2 |
| 4,480,898 A | 11/1984 | Taylor | |
| 4,629,285 A | 12/1986 | Carter et al. | |
| 4,851,165 A | 7/1989 | Rennell, Jr. et al. | |
| 5,146,531 A | 9/1992 | Shustack | |
| 5,147,433 A | 9/1992 | Petisce | |
| 5,259,060 A | 11/1993 | Edward et al. | |
| 5,377,292 A | * 12/1994 | Bartling et al. | ............. 118/405 |
| 5,379,363 A | 1/1995 | Bonicel et al. | |
| 5,598,498 A | * 1/1997 | Comezzi | ..................... 385/114 |
| 5,645,899 A | * 7/1997 | Unterberger | ................ 118/642 |
| 5,796,905 A | * 8/1998 | Hoffart et al. | ............... 385/102 |
| 5,837,750 A | * 11/1998 | Szum et al. | ................ 385/145 |
| 6,301,415 B1 | * 10/2001 | Zahora et al. | .............. 385/114 |
| 6,404,972 B1 | * 6/2002 | Pasch et al. | ................ 385/123 |

FOREIGN PATENT DOCUMENTS

| | | | |
|---|---|---|---|
| EP | 0 647 866 A | | 4/1995 |
| JP | 09-080275 A | * | 3/1997 |
| WO | WO 97/04343 | * | 2/1997 |
| WO | WO 98 43121 A | | 10/1998 |

* cited by examiner

Primary Examiner—Michael Barr
Assistant Examiner—Wesley Markham
(74) Attorney, Agent, or Firm—Sutherland Asbill & Brennan LLP

(57) ABSTRACT

A coated fiber strand including at least one heterogeneous region present in one or more coating layers. The heterogeneous region(s) preferably comprises a material useful for coding of the fiber. The optical fiber can include a primary coating layer and a secondary coating layer where the heterogeneous region(s) defines one or more colored stripes in or on the secondary coating layer. A method for forming a coated fiber, such as an optical fiber, includes introducing at least one coating layer onto a fiber strand such that one or more coating layers cover a portion of the surface of the strand. At least one heterogeneous region is introduced into or onto one or more coating layers, and the strand is cured to provide a desired product. A desired functionality, e.g., coding, can thus be introduced onto a fiber without adversely effecting subsequent processing steps, e.g., curing of the coating layer(s).

6 Claims, 5 Drawing Sheets

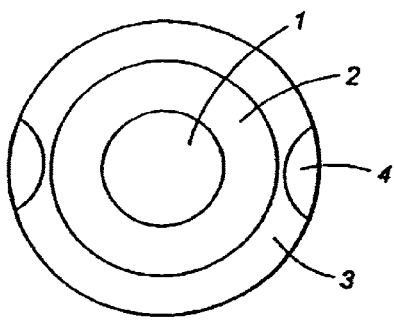
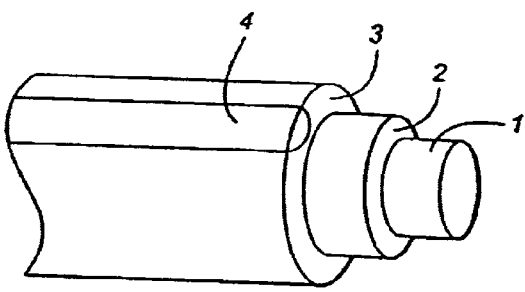
FIG. 3a  FIG. 3b
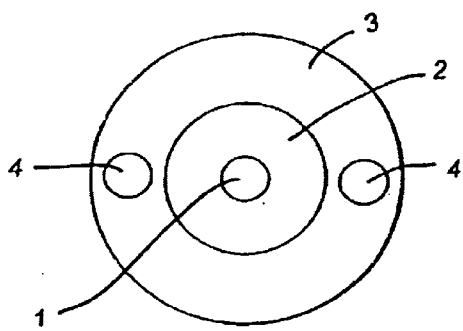
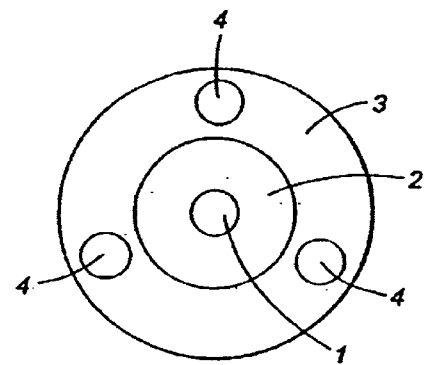
FIG. 4a  FIG. 4b
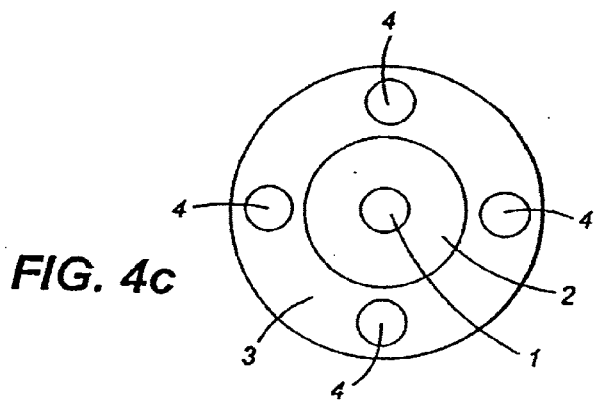
FIG. 4c

METHODS FOR MAKING COATED FIBER STRANDS HAVING ONE OR MORE HETEROGENEOUS REGIONS

CROSS REFERENCE TO RELATED APPLICATIONS

This application is a divisional of co-pending U.S. patent application Ser. No. 09/307,306, filed on May 7, 1999, now U.S. Pat. No. 6,317,553, and titled "Coated Fiber Strands Having One or More Heterogeneous Regions and Methods of Making the Same".

BACKGROUND OF THE INVENTION

Coated fiber strands can be used in making a variety of products. For example, optical fibers typically comprise a fiber optic strand having one or more resin coating layers which protect the fiber from environmental conditions such as dust and moisture that can adversely effect its properties.

Examples of multiple coating layers for optical fibers are disclosed in U.S. Pat. Nos. 4,480,898; 4,474,830; 4,851,165; and 5,146,531 each of which are incorporated by reference in their entirety for all purposes.

These coating layers often include a first, or primary, coating layer directly applied to the glass fiber, which acts as a "buffer" to cushion and protect the fiber, and a secondary coating layer. The secondary coating layer typically functions as a protective outer layer preventing damage to the fiber during processing and use.

Because optical fiber coatings are typically clear, the resulting optical fiber is not colored. However, it is known to provide a colored coating and therefore a colored optical fiber. In this regard, a desired color is mixed into the prepolymer containing composition that forms the desired coating. This colored coating is then introduced as a substitute for the secondary coating or as an additional tertiary coating onto the fiber.

While this technique has allowed for the "coloring" of fibers, it has introduced its own set of difficulties. For example, in processes which seek to cure both the primary and secondary coatings in a single curing step, the use of a colored secondary coating can adversely effect the cure of the inner or primary coatings and thus, lead to poor mechanical performance of the fiber.

Moreover, from a practical standpoint, insofar as a manufacturer must maintain a separate inventory for each of the colored coatings, inventory management is more complicated. For example, at least twelve different colors are employed in the field of telephony. Accordingly, to provide color fibers for use in such environments, manufacturers would be required to maintain a separate inventory for each of the desired colored secondary coatings.

SUMMARY OF THE INVENTION

The invention is based, at least in part, on the surprising discovery that one or more heterogeneous regions, e.g., coding stripes, can be introduced into or onto a coating layer on a fiber strand so as to provide for a desired functionality, e.g., coding of the fiber. Moreover, the region(s) can be introduced without adversely effecting subsequent processing steps used in making the fibers, e.g., curing of the coating layer(s).

One aspect of the present invention relates to a coated fiber which includes a fiber strand, at least one coating layer which is directly or indirectly on the strand, and at least one heterogeneous region present in or on one or more of the coating layer(s). A preferred embodiment of the invention involves the use of a primary coating layer and a secondary coating layer where the heterogeneous region(s) are in the secondary coating layer.

While the heterogeneous region(s) preferably comprise a colored material useful in color coding of the fiber, the region can be used to provide a number of desired functionalities to the resulting fiber.

Another aspect of the invention relates to a method for forming a coated fiber which includes introducing at least one coating layer onto a fiber strand such that the coating layer directly or indirectly covers at least a portion of the surface of the strand and introducing at least one heterogeneous region into or on one or more of the coating layer(s). The coated fiber can then be treated, e.g., cured so as to provide a desired product.

Once again, it is preferred that the method involves introducing a primary coating layer and a secondary coating layer onto a strand. The region(s) are preferably introduced simultaneously with or subsequent to the secondary coating layer prior to curing of the coating layer.

BRIEF DESCRIPTION OF THE DRAWINGS

FIGS. 1–5 illustrate coated fiber strands according to the present invention with FIGS. 1a, 1b, 2, 3a, 3b, 4a, 4b, 4c, and 5 providing cross-sectional views of coated fibers having one or more heterogeneous regions;

DETAILED DESCRIPTION OF PREFERRED EMBODIMENTS OF THE INVENTION

The present invention relates to a fiber arrangement suitable for use in connection with optical fibers. The fiber arrangement according to the invention includes at least one heterogeneous region that is present in or on a coating layer which itself is directly or indirectly located on the surface of a fiber strand.

By "heterogeneous region" it is meant that the region comprises a composition which differs from the composition of the surrounding or adjacent coating layer(s). This heterogeneous region comprises a material that provides a desired functionality to the region. In fact, the heterogeneous region can be devoid of material, e.g., define a "hole" within a coating layer or between coating layers.

While one or more heterogeneous regions can extend around at least a portion of the periphery of the fiber strand, it is preferred that, particularly in connection with UV curing, the heterogeneous region(s) do not extend continuously around the circumference of the fiber. However, often curing techniques, e.g., electron beam, may allow for a more fully "covered" surface.

It is further preferred that the heterogeneous regions extend longitudinally along the length of the strand defining, one or more heterogeneous "stripes" along at least a portion of the fiber strand. However, it is within the context of this invention that the regions can also be discontinuous along the length of the strand, defining, for example, a series of, e.g., "dots" and/or "dashes" along the length of the fiber strand.

The fibers according to the invention include fiber strands that are recognized in the art, preferably a fiber strand suitable for forming an optical fiber, one or more coating layers on the fiber strand and one or more heterogeneous regions.

The fiber strands can be produced for a variety of materials, including glass, polymers including plastics and the like. Moreover, coating materials suitable for use in the invention are dependent on the desired use for the coated fiber. For example, in the field of optical fibers, suitable primary and secondary coating material are well recognized in the field and include a variety of epoxy, urethane and acrylate-based resins.

Specific techniques for introducing a primary and secondary coating layer onto an optical fiber strand are also known. See, for example, in U.S. Pat. No. 5,147,433 which is incorporated by reference in its entirety. Other examples of and techniques relating to multiple coating of optical fibers are discussed in U.S. Pat. Nos. 4,480,898; 4,474,830; 4,851,165; and 5,146,531. These patents also illustrate suitable materials for both the primary and secondary coating layers. Accordingly, the general process of forming coated fibers suitable for use as optical fibers will not be described in detail here.

Figure 1A:
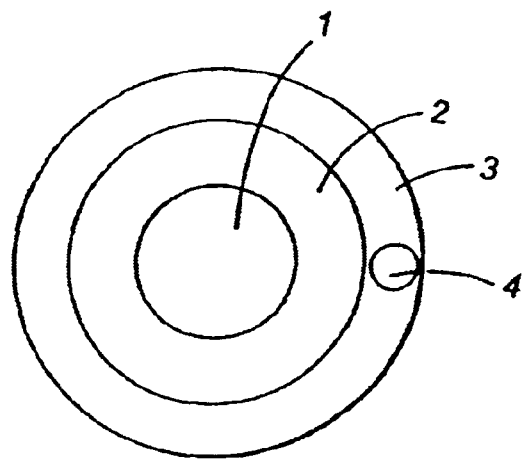
Figure 1B:
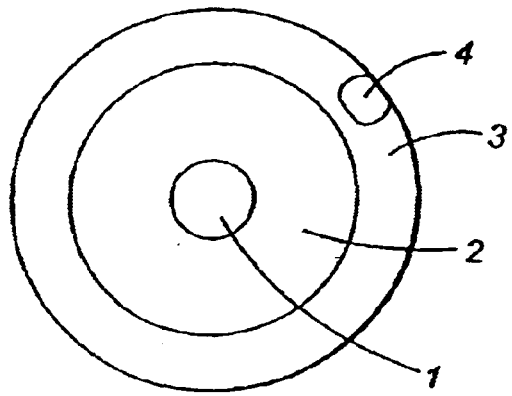
Figure 2:
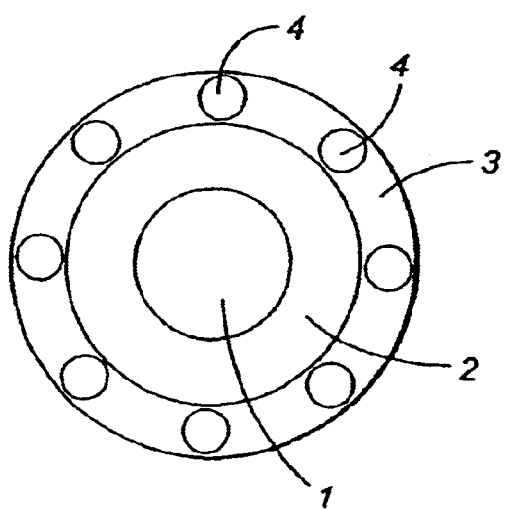

As discussed above, the present invention also includes one or more heterogeneous regions associated with a coating layer. FIGS. 1–5 illustrate examples of suitable arrangements. As can be seen from FIG. 1a, the heterogeneous region(s) can be located entirely within a coating layer while FIG. 1b illustrates the presence of a region on the outside of a coating layer. In addition, FIGS. 2, 3a–3b, 4a–4c, and 5 illustrate the use of multiple regions in connection with the fiber optic strand. In each case, a fiber strand 1 coated with a primary coating 2 and secondary coating 3 including one or more regions 4.

While these drawing figures illustrate the use of fibers having a two coating arrangement of primary and secondary coating layers, the present invention is not limited to such an arrangement.

Moreover, where more than one region is employed, the regions can be either radially spaced within a coating layer from the glass fiber and/or circumferentially spaced around the periphery of the coated fiber. The approximate number and location of regions is dependent upon the nature of the ultimate end-use of the fiber. In the field of coated optical fibers, the use of one to four regions is preferred.

While this specification will focus on the preferred use of one or more color-containing heterogeneous regions for coding of optical fibers, the region(s) can be used to provide a variety of different functions. For example, the region can comprise a conductive material to provide a conductive area within the fiber arrangement. In another embodiment, the stripe can comprise a material that would allow for bar coding of the strand. The region can also be used, e.g., to modify the properties of the fiber. For example, the region can comprise a material having a property, e.g., refractive index, which differs from the coating(s) on the strand. In fact, the region can be void of any material, e.g., comprise a "hole" in the coating layer.

Alternatively, the stripe can comprise a material that differs significantly from the coating layers. Examples of such materials include strength enhancing members and polarization mode dispersion (PMD) measuring elements such can provide a record of fiber twist, among others.

Yet another use for the region would be as a sensor element, such as a curing sensor for the fiber. For example, the region can comprise a material capable of changing color during a subsequent processing step, e.g., UV curing. Such a material would be used as a sensor to determine when the coating layer(s) were subjected to a UV radiation level suitable for curing by way of a color change in the region.

As discussed above, in the field of optical fibers, the region preferably comprises a colored material that would allow for coding of the fiber. To this end, the optical fibers according to the present invention preferably include one or more longitudinally extending heterogeneous regions so as to provide "stripes" on the fiber. The stripes can be of the same or different functionalities depending upon their intended purpose(s). Where coloring coding is the function, the stripes can be, for example, of the same or different colors.

The composition of the heterogeneous region-forming material can vary greatly depending on its function. In this regard, where the region is a colored stripe, the material can be any material suitable to add color to a coating layer of an optical fiber without adversely affecting the properties of the coating layer(s).

While not limited thereto, it is preferred that the stripe(s) be produced from a material that is compatible with the coating(s) on the fiber strand. For example, the use of the UV curable materials as a secondary coating layer is well recognized in the field of forming optical fibers. Where UV curable formulations, e.g., UV curable prepolymers, are employed in forming a secondary coating layer, it is preferred that the stripe-forming composition also includes the same base prepolymer as the secondary coating layer.

Where color stripes are desired, the stripe-forming compositions include one or more pigments or dyes. Such pigments and dyes can be premixed into the stripe forming composition. Suitable pigmented coating compositions for optical fibers are commercially available from Borden and DSM Desotech, Inc.

A desired color scheme for the fiber can also be provided through the use of photo bleaching. In this regard, a coating material comprises a material which allows for photo bleachability, i.e., a change in the absorption properties of the material such that it absorbs at a different wave length subsequent to opposition to radiation, e.g., visible light.

Figure 5:
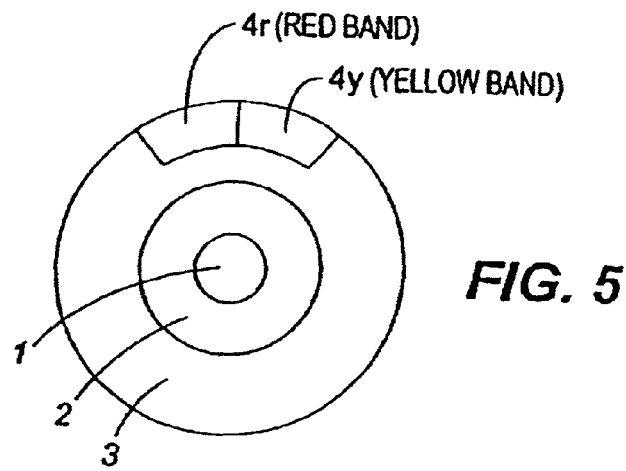

Yet another technique for providing a variety of colors to the fiber involves the use of one or more color stripes selectively arranged to alter the perceived color of the stripe and/or the fiber strand. As illustrated in FIG. 5, combining a red stripe 4r and a yellow stripe 4y together onto a fiber is capable of providing a perceived orange stripe. In this regard, approximately twelve colors can be provided by various combinations of five colors, e.g., white, black, blue, red, and yellow.

| COLOR DESIRED | STRIPES NEEDED |
| --- | --- |
| Red | Red Only |
| Blue | Blue Only |
| Yellow | Yellow Only |
| Violet | Red and Blue |
| Brown | Red and yellow and Green |
| Orange | Red and Yellow |
| Green | Blue and Yellow |
| Black | Blue and Green and Red |
| White | White |
| Aqua | White and Blue or Blue and Green |
| Slate or Grey | Black and White |
| Rose | White and Red |

In forming color stripe(s), color brighteners may be added to enhance the brilliance or hue of the colors in addition to the desired pigments. Suitable examples of such materials include stilbenes, phenanthrenes and the like. Such materials include optical brighteners that function by the mechanism of absorbing UV light and fluorescing or phosphorescing at longer wavelengths near or in the visible spectrum.

Another aspect of the invention involves methods for producing coated fiber strands and, in particular, an optical fiber including one or more heterogeneous regions. The method for making the fibers preferably involves introducing one or more heterogeneous region(s) within or on a coating layer which itself is directly or indirectly on the surface of the fiber strand.

As discussed above, techniques for producing optical fibers and, in particular, optical fibers including one or more coating layers are known in the art. The present invention can be employed with such processes. For example, this invention can be effectively employed with any recognized curing technique including ultra-violet (UV) and electron beam (EB) curing of the coating layer(s).

FIGS. 6–9 illustrate examples of preferred techniques for introducing the heterogeneous region into the coated fiber strand. This invention may, however, be embodied in many different forms and should not be construed as limited to the embodiments set forth in the drawing figure; rather, these embodiments are provided so that this disclosure will be thorough and complete, and will fully convey the scope of the invention to those skilled in the art. Like numbers refer to like elements throughout.

Figure 6:
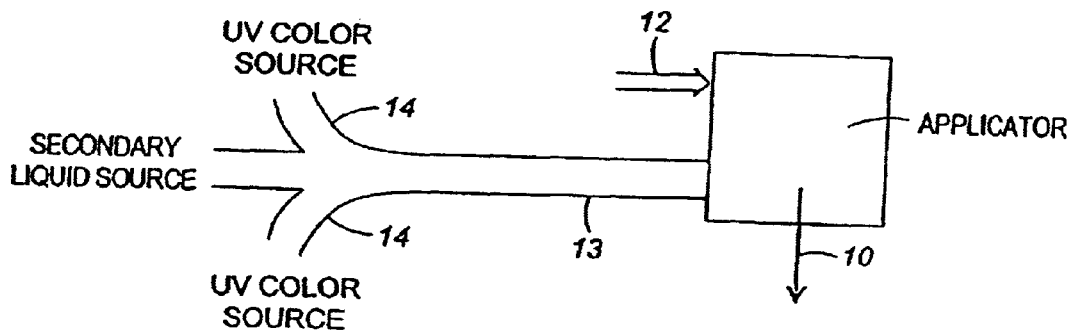
FIGS. 6, 7, 8, and 9 illustrate suitable techniques for the simultaneous introduction of heterogeneous regions together with one or more coating layers onto a fiber strand.

In FIG. 6, a glass fiber drawn in the direction generally indicated by reference numeral 10 is coated with both a primary coating layer application 12 and a secondary coating layer application 13. In addition, a suitable heterogeneous region-forming material, e.g., a UV color coating liquid, is introduced at one or more positions 14. Alternatively, air can be introduced into the coating layer at 14 to define a "hole" in the coating layer.

In this regard, most polymeric materials, e.g., UV curable prepolymer mixtures, do not typically mix during use, thus, the one or more heterogeneous region-forming compositions will flow onto the fiber strand to provide the desired stripe(s).

Figure 7:
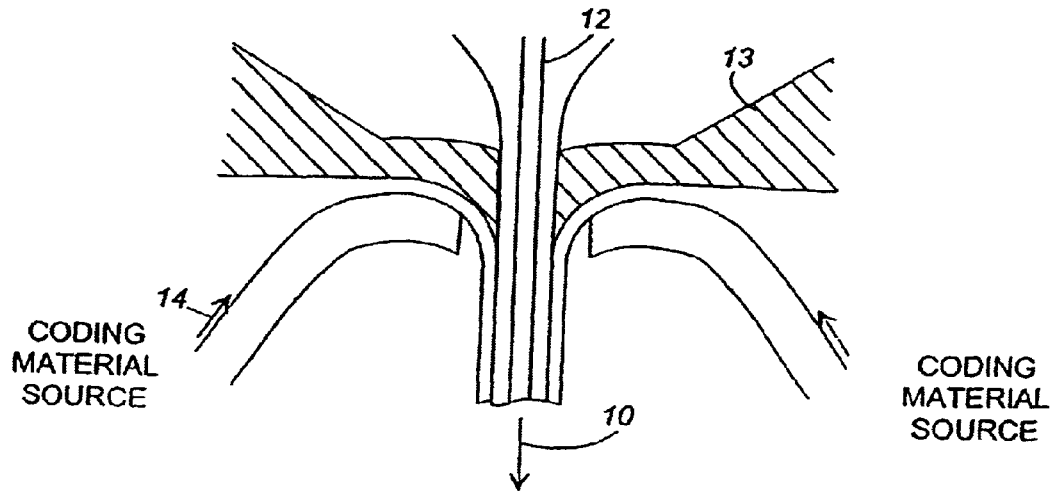

An example of a suitable arrangement is illustrated in FIG. 7. In FIG. 7, the fiber is drawn in the direction 10 with primary coating feed 12 and secondary coating feed 13 being introduced onto the strand. One or more of these heterogeneous region-forming material streams 14 are introduced with the secondary coating layer.

Once again, where insofar as the primary layer, secondary layer and stripe-forming material is selected such that the primary and secondary coating layers do not mix, the desired stripes are formed on the fiber.

Subsequent to stripe introduction the fiber is passed into a curing step (not shown) where the coating layers are subjected, for example, to UV or EB radiation so as to cure the coating layers.

Suitable apparatus elements for use in the present invention are recognized in the art. For example, any art recognized die can be effectively employed in the invention and as such are not described in detail here. However, for the sake of completeness, specific examples of suitable die include dual compact die and dual fixed die.

The amount of heterogeneous region-forming material can be controlled through a variety of techniques including pressure reduction, and apparatus such as metering valves.

Figure 8:
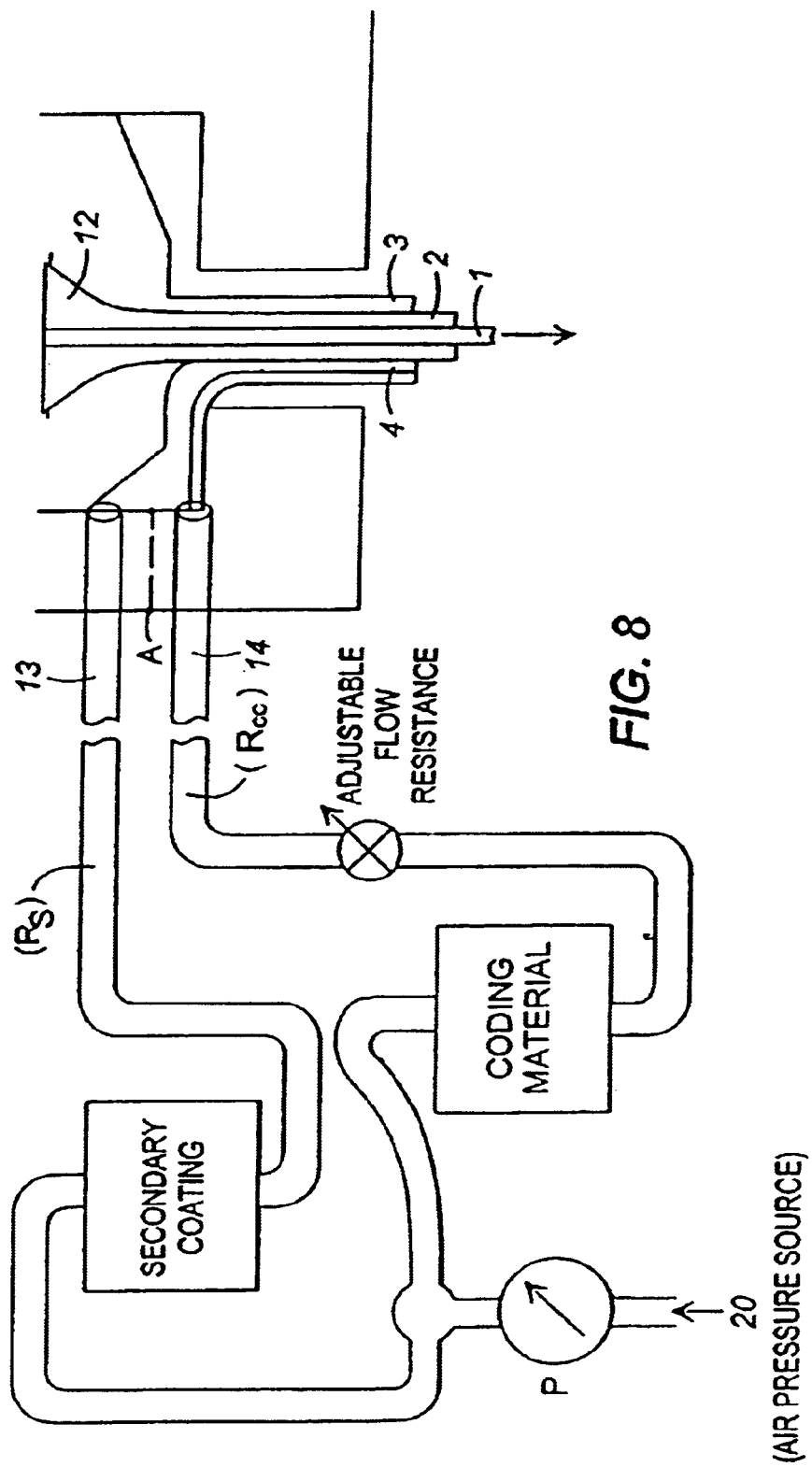
Figure 9:
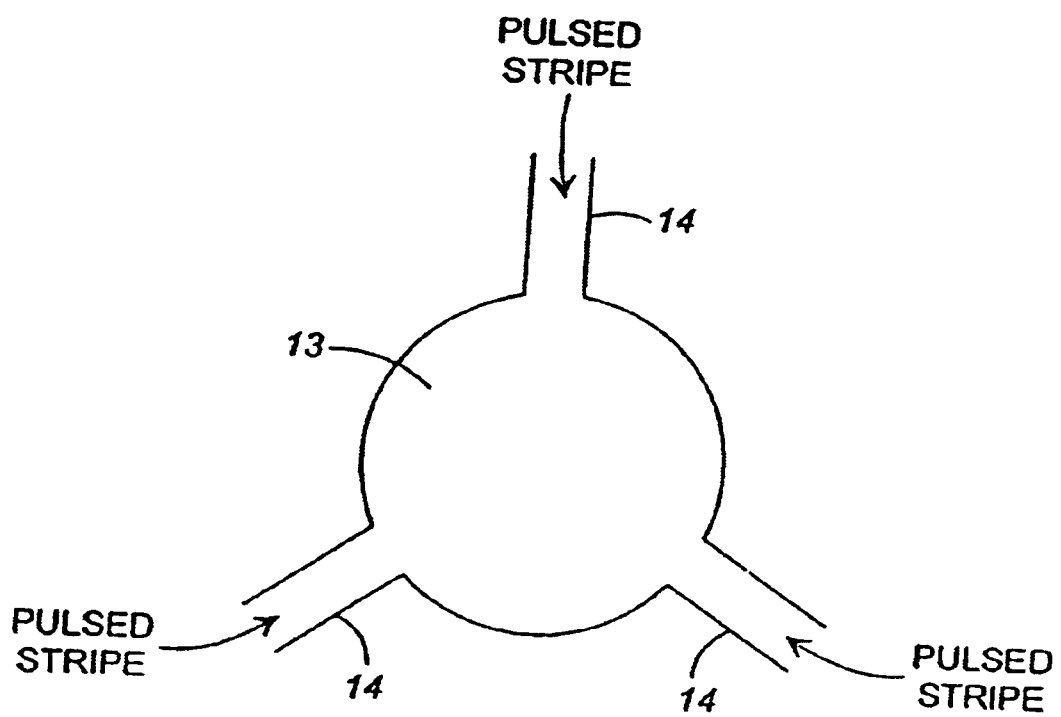

A specific example of a suitable process for introducing stripes is illustrated by the pressure feed configuration in FIG. 8, the pressure of both the reservoir for the secondary coating and the reservoir for the stripe-forming material is applied from a single gas source 20. Where pressure is maintained equal between the reservoir, the relative flow of the stripe-forming material is controlled by adjusting the ratio of resistance to flow between the feed lines of the secondary coating and the feed lines of the stripe-forming material:

$$\frac{\text{Flow Amount of Stripe Material}}{\text{Flow Amount of Secondary Coating}} \propto \frac{Rs}{Rcc}$$

where Rs is the resistance to flow in the feedline for the secondary coating and Rcc is the resistance in the feedline for the stripe forming material.

In addition, the location of the stripe relative to the coating layer can be adjusted depending upon the relationship of the stripe material feed line to that of the secondary coating feedline. For example, in FIG. 8, if the striping material is introduced at point A, the stripe will be completely encapsulated within the secondary coating material.

While the present invention has been discussed in connection with formation of a preferred stripe which extends longitudinally along the length of the optical fiber, additional modifications and optimizations can be employed.

For example, one or more pulse stripes can be introduced circumferentially around the fiber to produce random "lumps" of stripe-forming material on the fiber. Such a technique can be produced by the arrangement schematically illustrated be FIG. 9 where the pulses can be generated, for example, by a pulse pressure delivery system.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for applying a continuous longitudinal stripe along the length of a fiber optic strand comprising:

(a) passing a fiber optic strand through a primary coating die;

(b) applying a primary coating layer about and along the length of the strand during the drawing of the fiber optic strand;

(c) passing the coated strand through a secondary coating die;

(d) applying a secondary coating layer about and along the length of the coated strand during the drawing of the fiber optic strand; and (e) applying at least one stripe into the strand during application of the secondary coating and during the drawing of the fiber optic strand, such that said at least one stripe is completely encapsulated within the secondary coating layer.

2. The method of claim 1, wherein the primary coating layer and secondary coating layer are applied by a single coating applicator.

3. The method of claim 1, wherein the primary coating die and secondary coating die reside in a single coating applicator.

4. A method for applying a continuous longitudinal stripe along the length of a fiber optic strand comprising:

(a) passing a fiber optic strand through a primary coating die;

(b) applying a primary coating layer about and along the length of the strand during the drawing of the fiber optic strand;

(c) passing the coated strand through a secondary coating die;

(d) applying a secondary coating layer about and along the length of the coated strand during the drawing of the fiber optic strand; and (e) applying at least one heterogeneous region into the strand during application of the secondary coating and during the drawing of the fiber optic strand, such that said at least one heterogeneous region is completely encapsulated within the secondary coating layer.

5. The method of claim 4, wherein the primary coating layer and secondary coating layer are applied by a single coating applicator.

6. The method of claim 4, wherein the primary coating die and secondary coating die reside in a single coating applicator.

* * * * *